United States Patent [19]
Ohtsuki

[11] Patent Number: 5,329,505
[45] Date of Patent: Jul. 12, 1994

[54] SYSTEM AND METHOD FOR OVERWRITEABLE MAGNETO-OPTICAL RECORDING

[75] Inventor: Tomoko Ohtsuki, Tokyo, Japan

[73] Assignee: IBM Corporation, Armonk, N.Y.

[21] Appl. No.: 109,015

[22] Filed: Aug. 18, 1993

Related U.S. Application Data

[63] Continuation of Ser. No. 616,154, Nov. 20, 1990, abandoned.

[30] Foreign Application Priority Data

Dec. 8, 1989 [JP] Japan .................................. 1-317915

[51] Int. Cl.$^5$ ...................... G11B 13/04; G11B 11/10; G11B 11/12
[52] U.S. Cl. ........................................ 369/13; 360/59; 360/114
[58] Field of Search ................... 369/13, 14; 360/59, 360/114, 66, 60; 365/122

[56] References Cited

U.S. PATENT DOCUMENTS

| | | | |
|---|---|---|---|
| 4,771,347 | 9/1988 | Horimai et al. | 360/59 |
| 4,794,560 | 12/1988 | Bell et al. | 365/122 |
| 4,855,975 | 8/1989 | Akasaka et al. | 369/13 |
| 4,882,718 | 11/1989 | Kryder et al. | 369/13 |
| 4,938,915 | 7/1990 | Saito | 369/13 |
| 5,051,970 | 9/1991 | Ishii et al. | 360/59 |
| 5,093,817 | 3/1992 | Fujii et al. | 369/13 |
| 5,144,601 | 9/1992 | Maeda et al. | 360/59 |
| 5,175,714 | 12/1992 | Kikitsu | 360/59 |
| 5,187,694 | 2/1993 | Ichihara et al. | 360/59 |

FOREIGN PATENT DOCUMENTS

62-175948 8/1987 Japan .................. G11B 11/10

OTHER PUBLICATIONS

Matsumoto Hiroyuki et al., "Magneto-Optical Disk for Direct Overwrite by Light Power Modulation Method" pp. 45-46.

K. Aratani, et al., "Overwriting on a Magneto-Optical Disk With Magnetic Triple Layers by Means of the Light Intensity Modulation Method," SPIE vol. 1078, Optical Data Storage Topical Meeting (1989), pp. 258-264.

R. Kant, et al., "Laser-Induced Heating of a Multilayered Medium Resting on a Half-Space: Part II–Moving Source," Journal of Heat Transfer, vol. 113, Feb. 1991, pp. 12-20.

Primary Examiner—Hoa T. Nguyen
Attorney, Agent, or Firm—Douglas R. Millett

[57] ABSTRACT

A system and method for overwriteable magento-optical recording comprises a medium having a data layer and a reference layer. The medium is heated with a laser pulse of short duration which causes a temperature gradient between the data layer and the reference layer. The temperature of the data layer becomes greater than the Curie temperature of the data layer, but the reference layer remains at a temperature below the Curie temperature of the data layer. The magnetic orientation of the reference layer thus remains unchanged and the data layer will orient itself in the same direction as the reference layer. It is therefore not necessary that the Curie temperature of the reference layer be greater than that of the data layer.

24 Claims, 9 Drawing Sheets

SYSTEM AND METHOD FOR OVERWRITEABLE MAGNETO-OPTICAL RECORDING

This application is a continuation of application Ser. No. 07/616,154, filed on Nov. 20, 1990, now abandoned.

BACKGROUND OF THE INVENTION

1. Field of the Invention

This invention relates to a method and an apparatus for overwritable magneto-optical recording.

2. Description of the Prior Art

An optical disk allows higher-density recording than a magnetic disk, but is inferior in high-speed performance, with an access time that is several to ten times as long. A method for remedying this is overwriting. Conventionally, rewriting is done during three turns: erasing on the first turn, recording on the second, and error checking on the third. In contrast, overwriting will allow rewriting during only two turns, by erasing and recording simultaneously. One approach that uses two heads for erasing and recording to permit pseudo-overwriting has been proposed for overwritable magneto-optical recording. However, the system is complicated. Another method that allows simultaneous erasing and recording of adjacent tracks with two laser spots cannot be used in sector-based writing. On the other hand, a field modulation method, a light modulation method using an exchange-coupled double-layered film, and a light modulation method using a demagnetizing field have been proposed as direct overwrite methods. Of these, the light modulation overwrite method using an exchange-coupled double-layered film is superior to the field modulation system in that it provides easy high-speed modulation and allows a wide space between a bias magnet and a disk. However, there are problems in that the properties of the media must be controlled accurately, and that the laser power margins for reading and writing become smaller. The double-layered film overwrite method disclosed in JA Published Unexamined Patent Application (PUPA) No. 62-175948 is explained below.

The recording layer used in this method consists of two layers, a memory layer and a reference layer, which are exchange-coupled. Overwriting is performed by utilizing the difference in temperature dependence of the coercive forces (Hc) of the two layers. FIG. 15 shows the magnetic properties of an overwritable disk, and FIG. 16 shows a method of overwriting on this type of medium. Basically, this method utilizes the magnetic properties that the coercive force of the reference layer ($Hca2$) is smaller than that of the memory layer ($Hca1$) at room temperature ($Tamb1$) and that the Curie temperature of the reference layer ($Tc2$) is higher than that of the memory layer ($Tc1$). The magnitude of the external field $Hini$ applied before laser emission is set so that $Hca2 < Hini < Hca1$. First, only the magnetization of the reference layer follows $Hini$. In the example shown in FIG. 16, the direction of the magnetization of the reference layer becomes downward. The memory layer retains the recorded information, because $Hca1$ is large.

When a recording medium in this state is irradiated with a low-power laser beam, the temperature of the recording layer TL becomes $Tc1 < TL < Tc2$. Thus, the magnetization of the reference layer is not reversed by the weak external field Hb, so that the magnetization of the memory layer is oriented downward during the cooling process, following the magnetization of the reference layer, as shown in FIG. 16 (erasing). Thus, although the directions of the magnetic moments of similar atoms become essentially parallel to each other, in this case the directions of magnetization also become parallel to each other. When the laser power is high, the temperature of the recording layer TH becomes higher than $Tc2$. Thus the magnetization of the reference layer is reversed by the external field Hb, so that during the cooling process (writing) the magnetization of the memory layer is oriented in the same direction, that is, upward in FIG. 16. Recording by using the magnetization of the reference layer is hereinafter referred to as the "L process" and recording by using an external field is referred to as the "H process." The name of each process is derived from the temperature of the reference layer.

FIG. 17 shows the experimental results of the overwriting characteristics for a double-layered film whose memory layer consists of TbFeCo and whose reference layer consists of DyFeCo, reported by Matsumoto Hiroyuki, et al. in "Magneto-optical Disk for Direct Overwrite by Light Power Modulation Method," Symposium on Optical Memory '88, Article Collection 45 (1988). The right side of FIG. 17 shows the carrier level in the H process, which is a recording process with high laser power. The results are obtained by using a modulated light of 1 MHz to record on the medium with its data erased. The left side of FIG. 17 shows the signal level of data left unerased during the L process, which is an erasing process with low laser power. The results are obtained by using CW (constant wavelength) unmodulated light to erase signals of 1 MHz written onto a medium.

When the H/L processes are done by modulating the power of pulses of long duration (the duration is hereinafter referred to as "pulse width") of the order of one hundred nanoseconds conventionally, it is necessary to divide the laser power level into three regions: PR (reading), PL (L process), and PH (H process). Accordingly, the margin for each of them is lower than when overwriting is not performed, and therefore it is sufficient to provide only two power levels for reading and writing. Furthermore, since $Tc2$ is set at a high temperature to obtain a margin for laser power in the L process (PL), the medium is exposed to a high temperature in the H process, which may cause deterioration. Other problems are that the decreased margin requires accurate control of the properties of the medium, and that the characteristics of write/read are apt to be influenced by fluctuations in the laser power and ambient temperature.

The magnetic recording medium disclosed in JA PUPA No. 62-80847 comprises a memory layer for retaining domains with desired field orientations representative of binary data, a reference layer for providing a bias field as a function of the temperature for obtaining the domains of desired magnetic field orientations in the memory layer, and a thermal isolation layer for isolating the memory layer from the reference layer. Laser pulses are emitted from the memory-layer side of the medium and the durations are changed in response to recording or erasing. During recording, the duration is typically decreased to 50 nanoseconds so that the memory layer is heated to above the Curie temperature, while the reference layer, which is isolated by the thermal isolation layer, is held at a relatively low temperature.

During erasing, on the other hand, duration is typically increased to 500-600 nanoseconds so as to heat the reference layer to a sufficiently high temperature. However, sufficiently long durations of laser pulses for heating the reference layer, which is isolated by the thermal insulation layer, require slow disk rotation, and hence prevent an increase in the data transfer rate. Furthermore, interposition of the thermal isolation layer is considered to make it impossible to utilize the exchange-coupling between the memory layer and the reference layer described in JA PUPA No. 62-175948.

SUMMARY OF THE INVENTION

An objective of the present invention is to record data in the memory layer by changing the temperature gradients along the thickness of the recording medium and thus controlling the temperature of the reference layer.

To attain this objective, the invented method for magneto-optical recording by using a magnetic recording medium and means for emitting a pulsed laser, the magnetic recording medium comprising a memory layer for retaining domains with field orientations representative of binary data and a reference layer laminated directly or via an intermediate thermally conductive layer onto the memory layer, where the magnetic properties of the reference layer varies with the temperature in a different way from those of the memory layer, the domains of desired magnetization orientations being set in the memory layer by utilizing the change in magnetic property of the reference layer resulting from the temperature change, comprises the steps of:

(a) moving the magnetic recording medium relative to the laser pulse emission means; and
(b) controlling the temperature of the reference layer selectively by switching the durations of the laser pulses generated by the laser pulse emission means for heating the memory layer to a temperature near or above the Curie temperature, according to the binary data to be recorded in the memory layer, thereby changing the magnetic property of the reference layer in order to record the desired binary data in the memory layer.

In addition, the invented apparatus for magneto-optical recording by using a magnetic recording medium and means for emitting a pulsed laser, the magnetic recording medium comprising a memory layer for retaining domains with field orientations representative of binary data and a reference layer laminated directly or via an intermediate thermally conductive layer onto the memory layer, where the magnetic properties of the reference layer varies with the temperature in a different way from those of the memory layer, the domains of desired magnetization orientations being set in the memory layer by utilizing the change in magnetic property of the reference layer resulting from the temperature change, comprises:

(a) means for moving the magnetic recording medium relative to the laser pulse emission means; and
(b) means for controlling the temperature of the reference layer selectively by alternating the durations of the laser pulses generated by the laser pulse emission means for heating the memory layer to a temperature near or above the Curie temperature, according to the binary data to be recorded in the memory layer, thereby changing the magnetic property of the reference layer in order to record the desired binary data in the memory layer.

This scheme makes overwrite recording possible by utilizing the exchange-coupling between the memory layer and the reference layer. It also makes it possible to increase the laser power margin by using in the L process short pulses that produce a sufficiently large temperature difference between the above two layers, while using laser pulses of long duration in the H process so that the temperature of the memory layer and that of the reference layer become high simultaneously, as in conventional cases. In the conventional light modulation overwrite method using an exchange-coupled double-layered film, the characteristics of data writing/readout are vulnerable to fluctuations in laser power and ambient temperature, and cannot cope with fluctuations in the media sensitivity, which makes the method impractical. However, the present invention remedies these problems and makes the the multilayered film overwriting method feasible.

For a fuller understanding of the nature and advantages of the present invention reference should be made to the following detailed description taken into conjunction with the accompanying drawings.

DESCRIPTION OF THE PREFERRED EMBODIMENTS

The disk structure shown in Table 1 is considered as an example of an exchange coupled double-layer medium. A relatively thick reference layer with a large thermal conductivity is used under the memory layer.

TABLE 1

Material Constants and Parameters Used in Calculation

Laser light
Strength distribution: Gaussian distribution
(full-width half-maximum diameter 0.9 μm)
Rectangular pulse (L process: 1 nanosecond,
 H process: 100 nanoseconds)
Incident from base side

| Layer structure | Heat conductivity (cal/s · k · cm) | Density (g/cm$^3$) | Specific Heat (cal/g · k) | Thickness (Angstroms) |
|---|---|---|---|---|
| Disk | | | | |
| Glass substrate | 0.0025 | 2.76 | 0.200 | $1.2 \times 10^7$ |
| Protective layer | 0.003 | 2.20 | 0.180 | 700 |
| Recording Layer | | | | |
| Memory layer | 0.095 | 7.87 | 0.097 | 500 |
| Reference layer | 0.095 | 7.87 | 0.097 | 1,500 |
| Protective layer | 0.003 | 2.20 | 0.180 | 700 |

Linear velocity 10.7 m/s

FIGS. 1-4 show the simulated change in peak temperature with time on the recording surface of a disk whose structure is outlined in Table 1. The pulse widths of the emitted lasers are assumed to be 1 nanosecond for a short pulse and 100 nanoseconds for a long pulse. The vertical axis shows the temperature change from room temperature. The values are calculated for the interface between the protective and memory layers, the memory and reference layers, and the reference and protective layers, then normalized by the peak power of the emitted laser. The 1-ns pulse raises the maximum temperature of the reference layer on the side opposite to the laser emission, to only 47% of that of the laser emission side of the memory layer, and induces a temperature gradient along the thickness, while the 100-ns pulse raises the maximum temperature of the reference layer to 93% of that of the memory layer, inducing no substantial temperature gradient.

A simulation was performed by using the computer program for thermal analysis given by R. Kant and K.L. Dockert in "Laser Induced Heating of a Multilayered Medium Resting on a Half Space: Part II—Moving Source," IBM Research Report RJ 5998 (59597) (1987).

Figure 1:
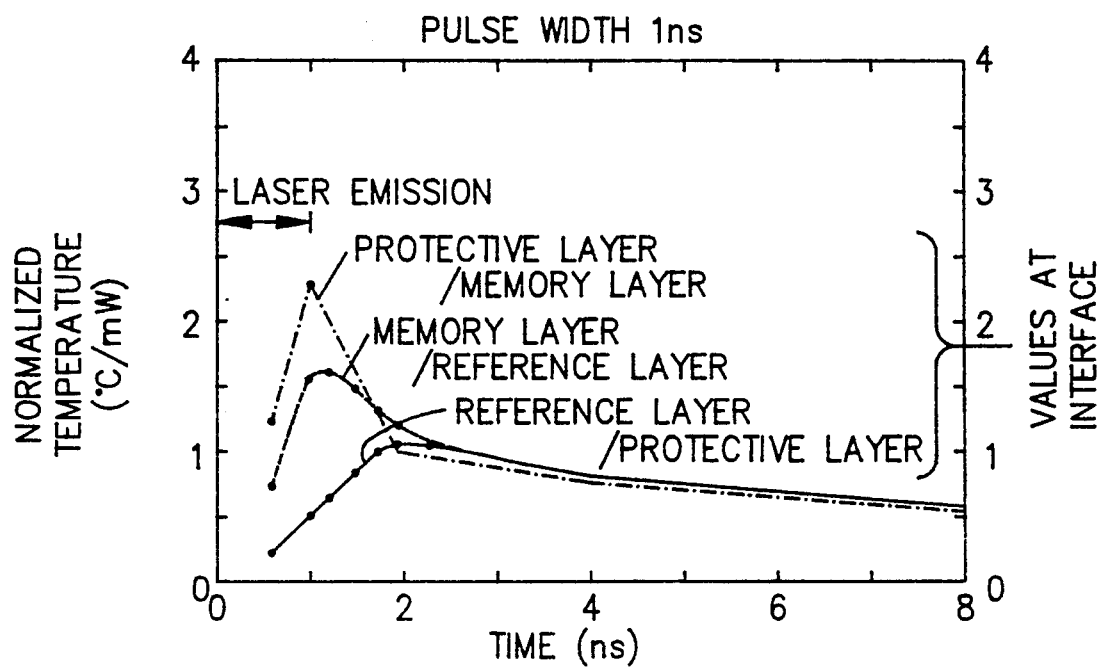
FIG. 1 is a graph of temperature versus time for a recording media of the present invention which is subjected to a one nanosecond laser pulse.
Figure 2:
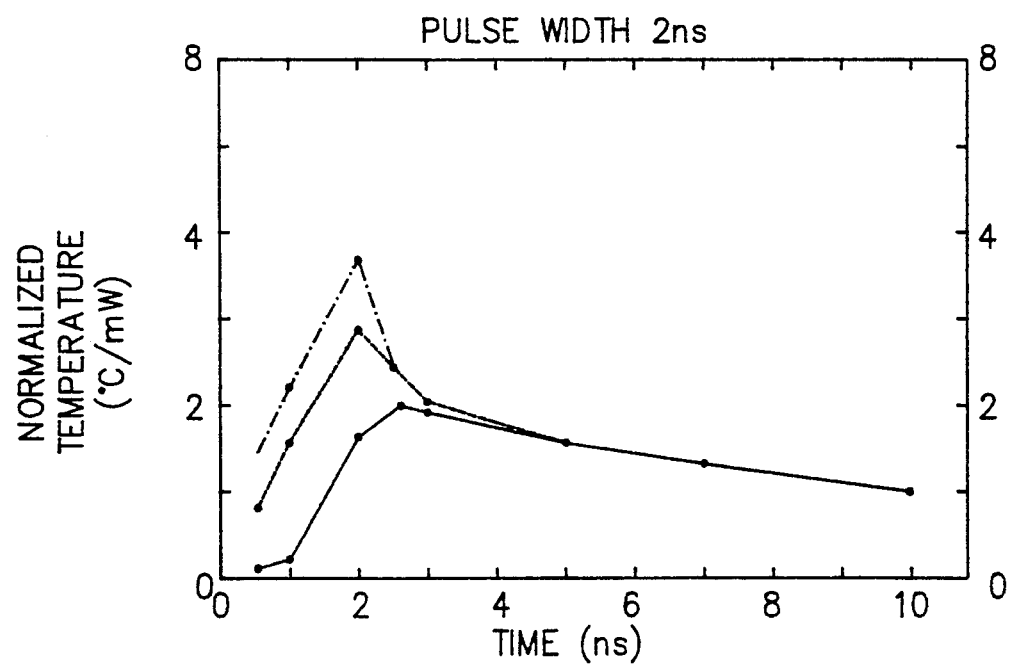
FIG. 2 is a graph of temperature versus time for a recording media of the present invention which is subjected to a two nanosecond laser pulse.
Figure 3:
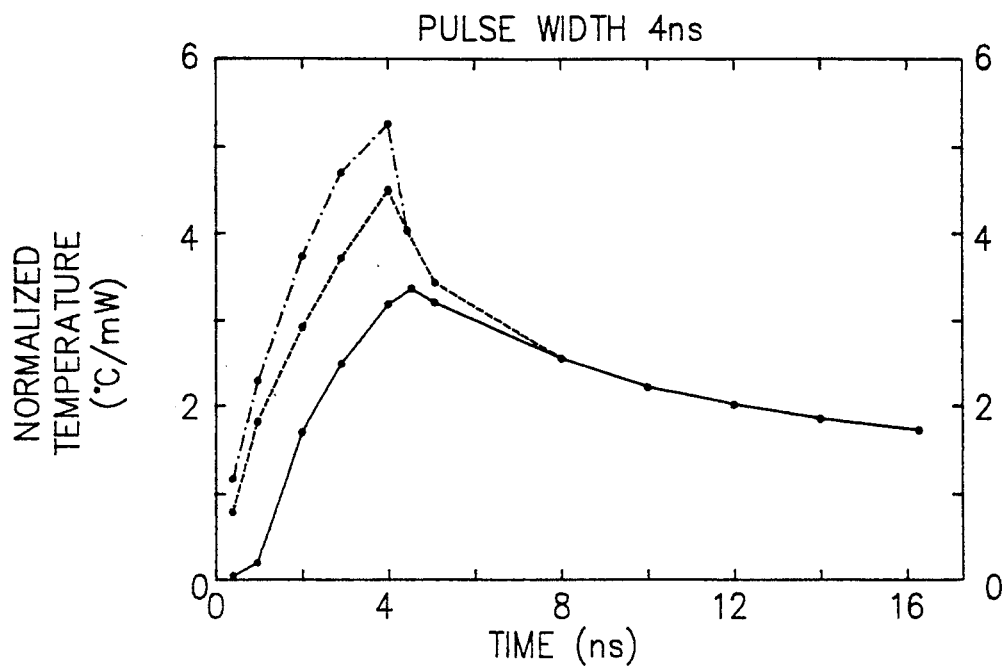
FIG. 3 is a graph of temperature versus time for a recording media of the present invention which is subjected to a four nanosecond laser pulse.
Figure 4:
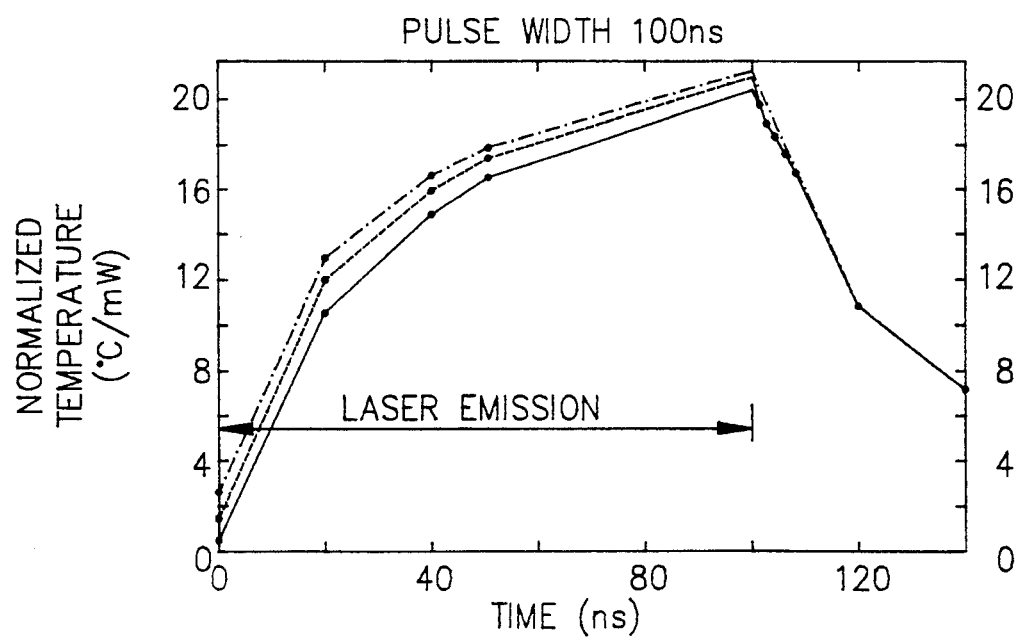
FIG. 4 is a graph of temperature versus time for a recording media of the present invention which is subjected to a one hundred nanosecond laser pulse.
Figure 5:
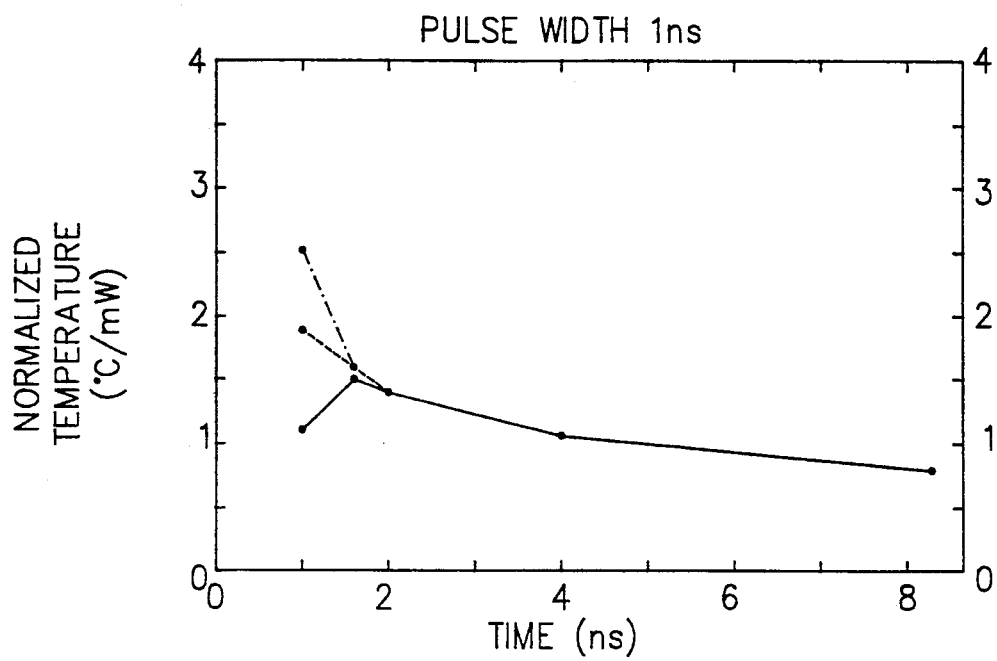
FIG. 5 is a graph of temperature versus time for an alternative recording media of the present invention which is subjected to a one nanosecond laser pulse.
Figure 6:
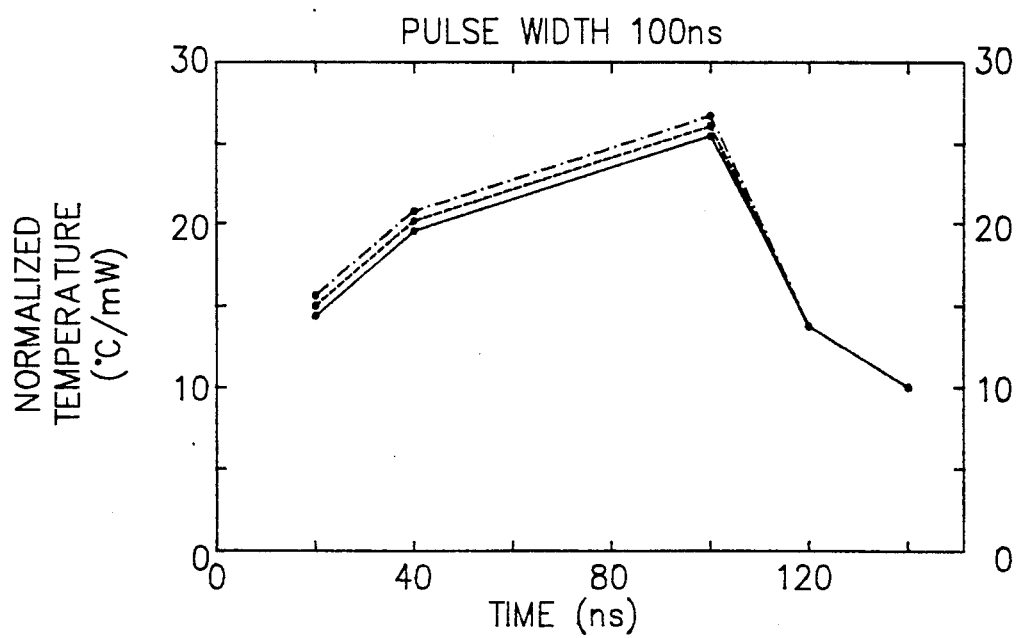
FIG. 6 is a graph of temperature versus time for an alternative embodiment of a recording media of the present invention which is subjected to a one hundred nanosecond laser pulse.

FIGS. 5 and 6 show the simulation results for the temperature rise in a disk of the same structure as in Table 1, except that the thickness of the reference layer is 1000 A. A sufficiently large temperature difference is induced by the 1-ns pulse along the thickness, but not by the 100-ns pulse.

Figure 7:
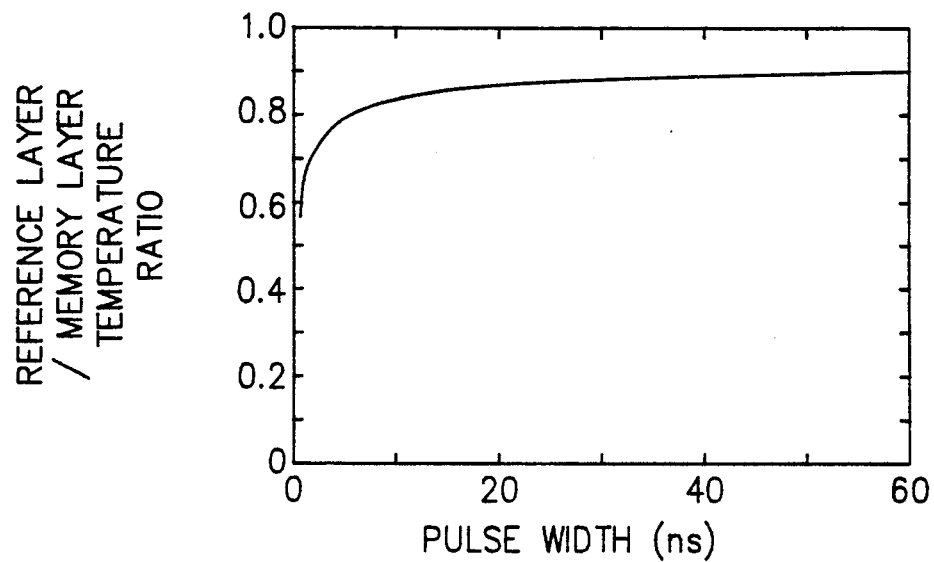
FIG. 7 is a graph of temperature ratio versus pulse width for a recording media of the present invention.

FIG. 7 shows the simulation results for the ratio of the temperature rise at the midpoint of the reference layer to that at the midpoint of the memory layer of the disk outlined in Table 1 when it is irradiated by pulses of various durations. These results indicate that a combination of short pulses of the order of one nanosecond and pulses longer than a few tens of nanoseconds makes it possible to control the temperature difference between the two layers. Short pulses induce temperature gradients because the heating of the recording layer is completed before the whole layer reaches thermal equilibrium.

Figure 15:
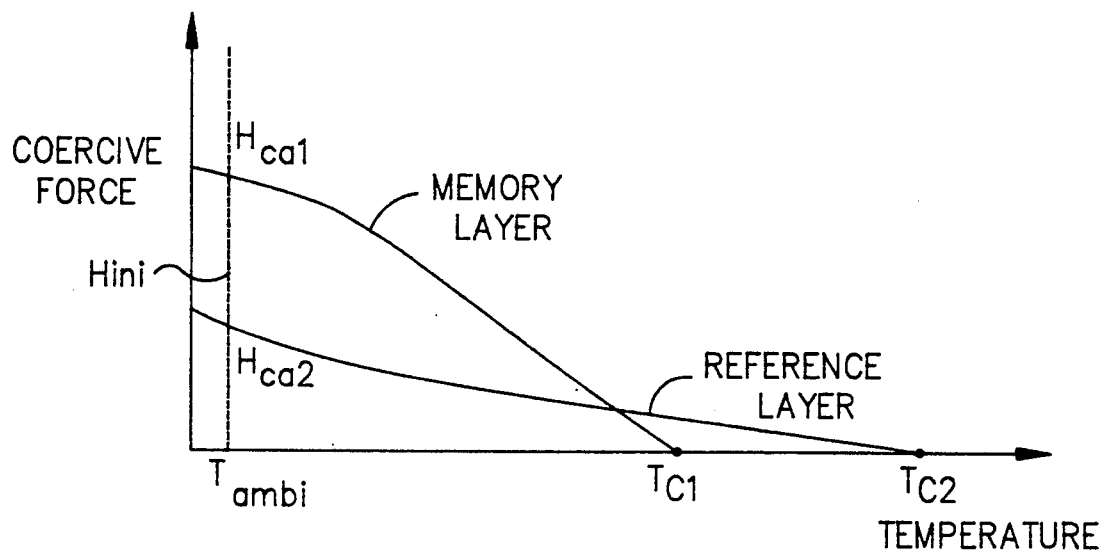
FIG. 15 is a graph of coercive force versus temperature for a typical double-sided recording medium of the prior art.
Figure 17:
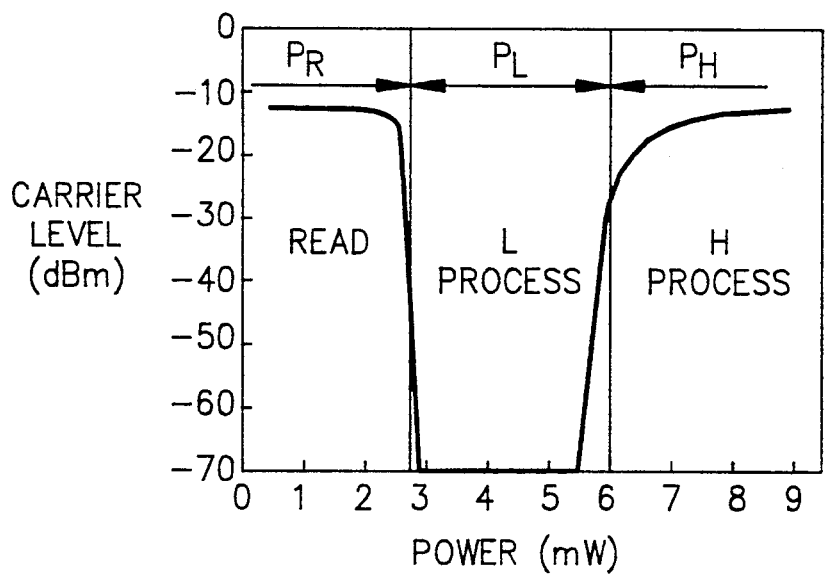
FIG. 17 is a graph of carrier level versus power for a recording media of the prior art after it has been written upon.
Figure 16:
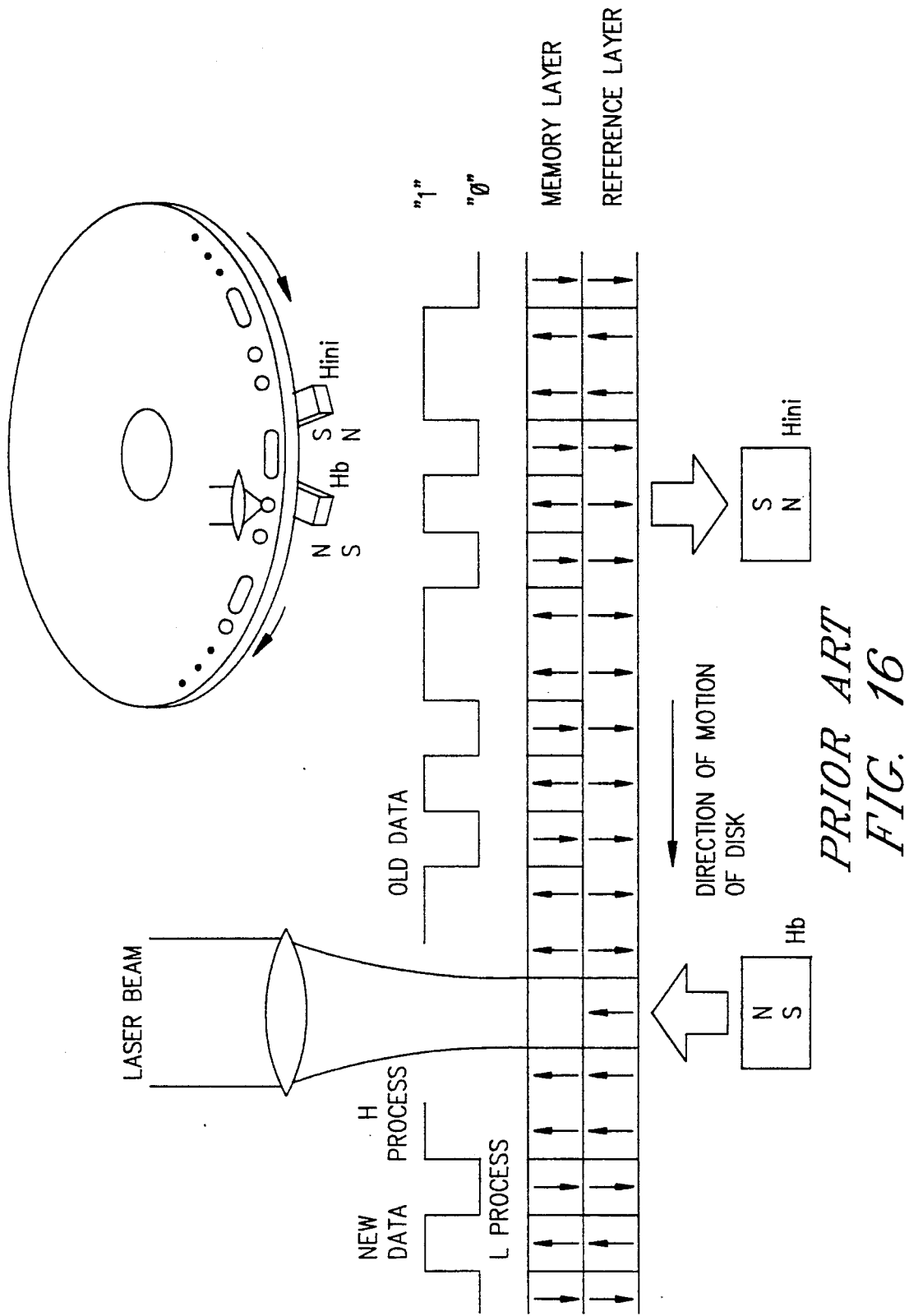
FIG. 16 is an illustration of the overwrite process using a double-layered recording medium of the prior art.

In the conventional overwrite method by light modulation, both the memory and reference layers are heated to nearly the same temperature in both H and L processes, and writing/erasing is effected by using only the difference in the Curie temperatures of the medium's layers, as shown in FIG. 15. The present invention takes advantage of the change in the temperature gradients in the recording layer to carry out overwriting.

Figure 10:
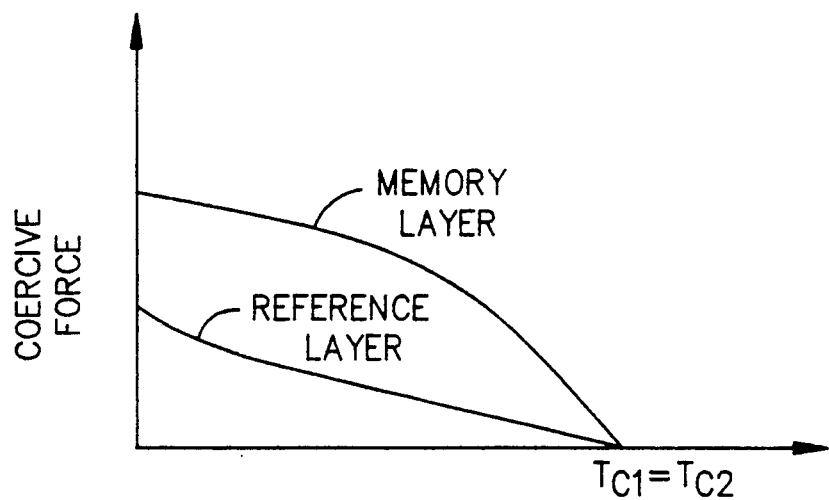
FIG. 10 is a graph of temperature versus coercive force for a double-layered recording medium.
Figure 8:
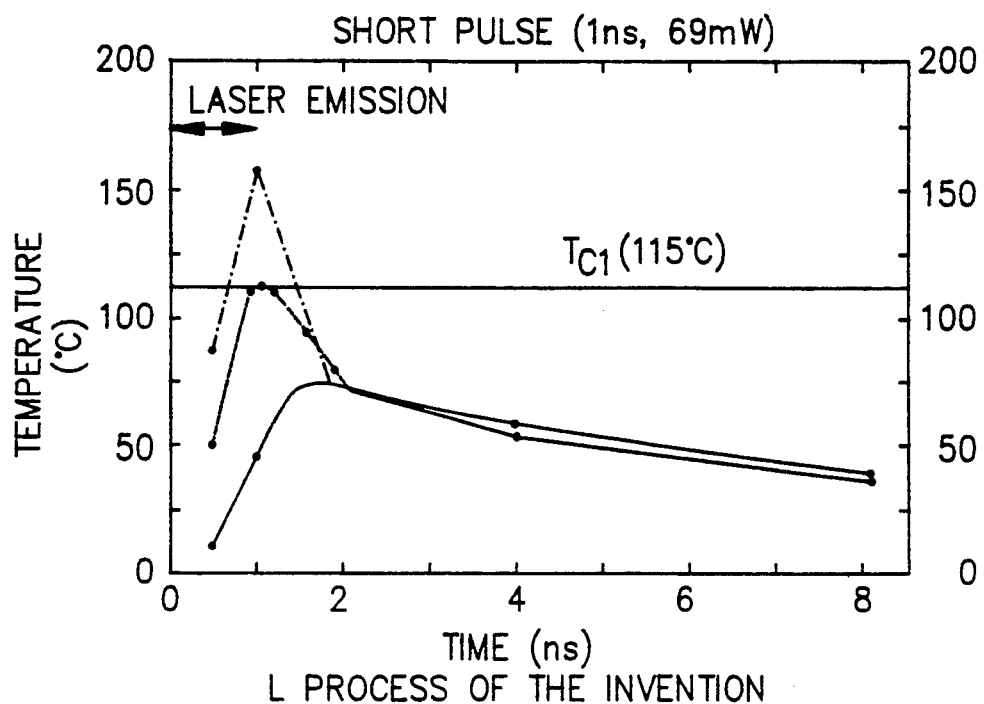
FIG. 8 is a graph of temperature versus time for a short pulse process of the present invention.
Figure 9:
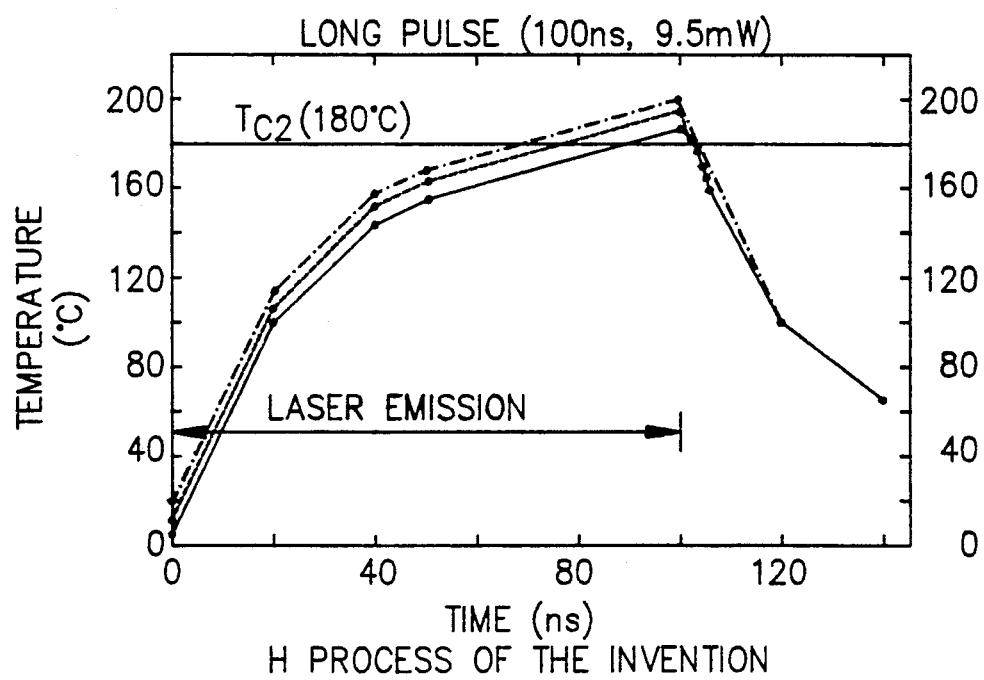
FIG. 9 is a graph of temperature versus time for a long pulse process of the present invention.
Figure 11:
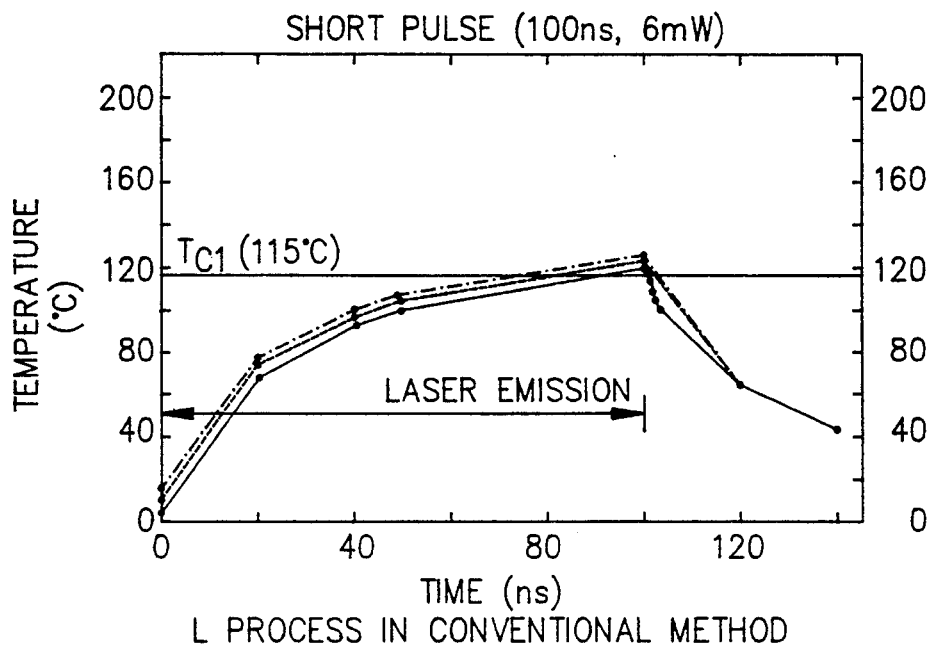
FIG. 11 is a graph of temperature versus time for a recording medium in the prior art method.

When short pulses are emitted, the L process is carried out by utilizing the temperature gradients and raising the temperature of the memory layer only sufficiently to change its magnetization direction (see FIG. 8). Here, since the temperature rise in the reference layer is small, the coercive force of the layer is large enough to keep its magnetization direction in the initial state. When long pulses are emitted, both the memory and reference layers can be heated to sufficiently high temperatures. Therefore, the coercive forces of both layers become small, and the H process can be carried out (see FIG. 9) to change their magnetization directions. In this case, it is possible in principle to overwrite even if the Curie temperatures of the memory layer and the reference layer are equal, as shown in FIG. 10. FIG. 11 shows as reference the simulation results for a case in which the long pulse is used even in the L process, as before.

The laser power margins in the L/H processes are estimated for the case of a double-layered film of the type shown in FIG. 15 on the assumption that the Curie temperature of the memory layer Tc1 equals 135° C., that of the reference layer Tc2 200° C., and the room temperature Ta 20° C. Here, it is also assumed that the L process will occur when a half or more of the memory layer is heated to a temperature of Tc1 or more while a half of the reference layer is less than Tc2 in temperature, and that the H process will occur when a half of the reference layer is heated to a temperature of Tc2 or more.

According to the invention, the range of the laser power PL that causes the L process is 58 mW < PL < 132 mW (pulse width: 1 nanosecond)

The range of the laser power PH that causes the H process is 8.7 mW < PH (pulse width: 100 nanoseconds)

On the same assumption, the ranges in the conventional method are 5.4 mW < PL < 8.7 mW 87 mW < PH The ranges of the laser power in the H and L processes can be made widely different by this method. In addition, the laser power margin in the L process is improved from the conventional value 8.7/5.4 = 1.6 to 132/58 = 2.3.

As described above, the invention allows overwriting by controlling the temperature gradients of the memory and reference layers, and can improve the laser power margin for data write/read. This permits overwriting whose write/read characteristics are resistant to variations in the laser power and the ambient temperature, and also increases the tolerance toward fluctuation in the sensitivity of the medium.

Figure 12:
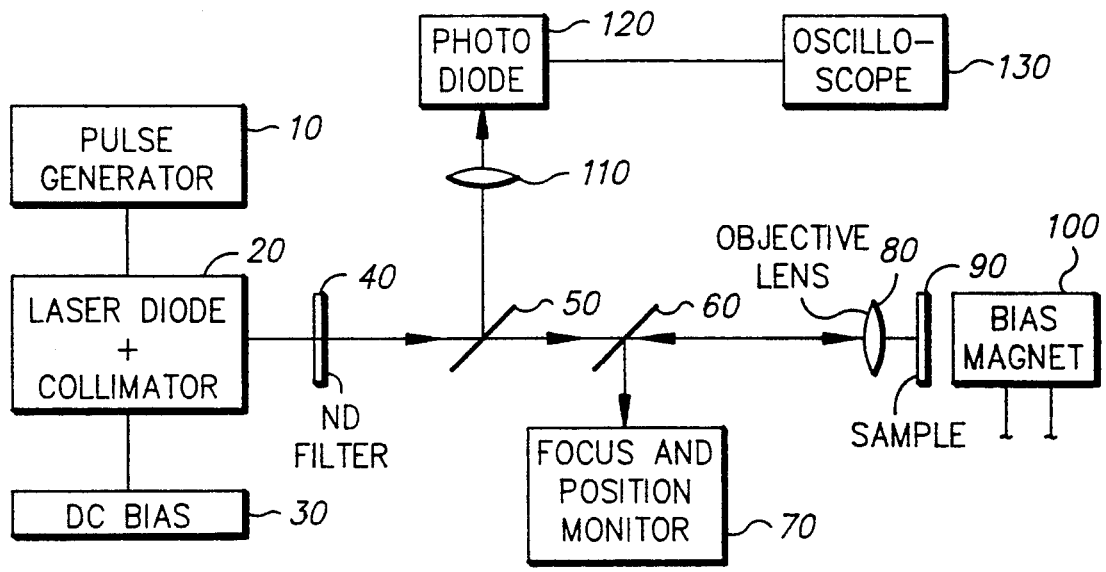
FIG. 12 is a schematic view of the system of the present invention.

The following is an explanation of an experiment to demonstrate that the invention increases the laser power margin of the L process. In the experiment, a medium as shown in Table 2 and a system as shown in FIG. 12 were used.

TABLE 2

| Layer | Composition | Thickness |
|---|---|---|
| Protective layer | SiN | 90 nm |
| Memory layer | Tb20Fe80 (Curie temp. = 130° C.) | 60 nm |
| Reference layer | Tb27Fe63Co10 (Curie temp. = 175° C., Compensating temp. = 155° C.) | 120 nm |
| Glass substrate | — | 1.1 mm |

The thickness of each layer was estimated from the sputtering time. In the experiment, a laser pulse with a full-width half-maximum diameter of 0.47 microns was emitted. The time width of the laser pulse was controlled by changing the time width of the current pulse flowing through the laser diode. The light was passed through a ND (neutral density) filter. Neutral density means that the transmissivity does not depend on the wavelength of the light. The ND filter was used to control the laser power incident on the surface of the sample. The bias magnetic field (Hb) was kept at 110 Oe. Domains written in the memory layer were observed with a polarizing microscope with an oil-immersion objective lens. Observation of domains make it possible to tell whether the L process has been achieved or not. The sample was intialized with an Hini magnet (not shown) of 6kOe prior to the experiment.

Figure 13:
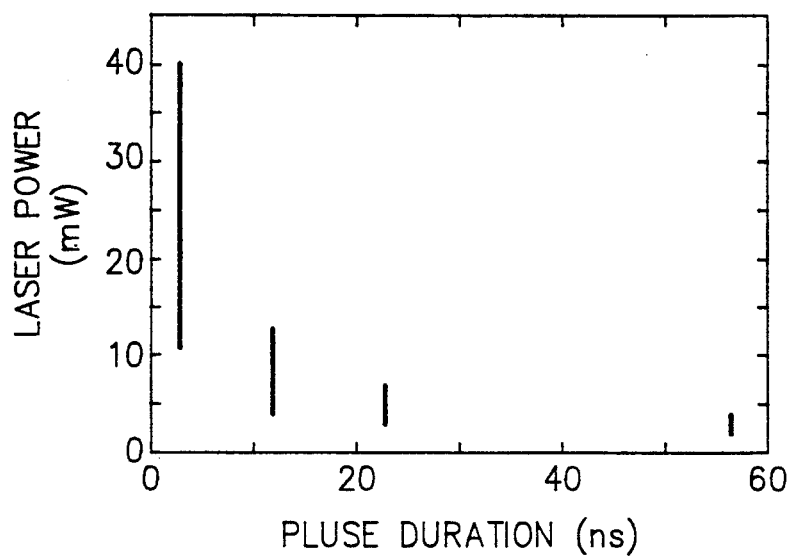
FIG. 13 is a graph of laser power versus pulse duration for tests of the present invention.
Figure 14:
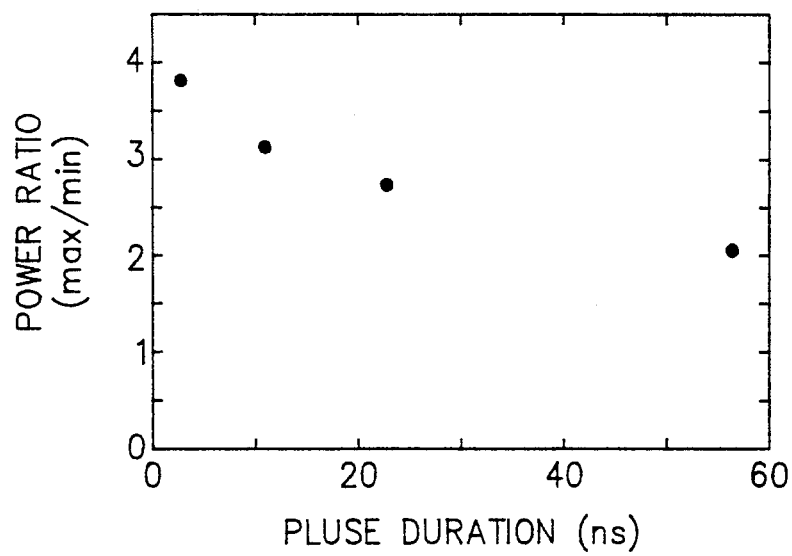
FIG. 14 is a graph of power ratio versus pulse duration for tests of the present invention.

FIG. 13 shows the laser power range of the L process for several different pulse durations. FIG. 14 shows the relationship between the pulse duration and the ratio of the maximum laser power to the minimum one in the L process, on the basis of the experimental results shown in FIG. 13. The ratio increases with a decrease in the pulse duration. In particular, a 2.7-ns pulse expands the range to 1.8 times wider than that of a 56-ns pulse. These results imply that a short pulse of the order of one nanosecond heats up only the memory layer for a wide range of laser power, while the reference layer is kept at a low temperature; that is, that a short pulse induces through-thickness temperature gradients.

The above description is given for a medium with a memory layer directly laminated over a reference layer. However, the scope of the invention is not limited to that example. It has been proposed, for example, to put a heat-conductive thin intermediate layer between the memory and reference layers to control the strength of the exchange-coupling. (See K. Aratani et al., "Overwriting on a Magneto-optical Disk with Magnetic Triple Layers by Means of the Light Intensity Modulation Method," Proceedings of Optical Data Storage Topical Meeting, Vol. 1078, 1989, page 258.) The proposed invention is also applicable to magneto-optical recording that uses a medium containing such an intermediate layer. In this case, the power enabling the L process has a higher maximum value than when there is no intermediate layer, and therefore the power margin for the L process increases somewhat.

The invention makes it possible to overwrite a medium by controlling the temperature of the reference layer with no thermal isolation layer interposed between the memory and reference layers. It is also possible to expand the margin of the laser power because data is recorded in the memory layer while the reference layer is kept at a low temperature.

While the invention has been particularly shown and described with references to particular embodiments thereof, it will be understood by those skilled in the art the various other changes in form and details may be made therein without departing from the spirit and scope of the invention.

What is claimed is:

1. A data recording system comprising:
   a recording medium having a data layer and a reference layer;
   an electromagnetic source for directing an electromagnetic beam at the recording medium;
   a pulse means connected to the electromagnetic source for causing the electromagnetic source to pulse for a first period of time and a second period of time, the first period of time of short enough duration to create a temperature differential between the data layer and the reference layer such that the data layer is heated to a first temperature at least equal to the Curie temperature of the data layer and the reference layer is heated to a second temperature less than the Curie temperature of the data layer, the second period of time being sufficient to heat the reference layer to a temperature at least equal to the Curie temperature of the reference layer; and
   a magnetic source positioned proximate the medium for providing a magnetic field.

2. The system of claim 1, further including;
   a second magnetic source positioned proximate the medium for providing a magnetic force less than the coercive force of the data layer and greater than the coercive force of the reference layer at ambient temperature.

3. The system of claim 1, wherein the Curie temperature of the data layer is less than the Curie temperature of the reference layer.

4. The system of claim 1, wherein the Curie temperature of the data layer is substantially equal to the Curie temperature of the reference layer.

5. The system of claim 1, wherein the data layer is comprised of $Tb_{20}Fe_{80}$ and the reference layer is comprised of $Tb_{27}Fe_{63}Co_{10}$.

6. The system of claim 1, wherein the thickness of the reference layer is greater than the thickness of the data layer.

7. The system of claim 1, wherein the first period of time is not greater than one nanosecond.

8. The system of claim 1, wherein the second period of time is not greater than 100 nanoseconds.

9. The system of claim 1, wherein the electromagnetic source comprises a laser.

10. The system of claim 9, wherein the laser is set at a first power level for the first period of time and a second power level for the second period of time, and the second power level is less than the first power level.

11. The system of claim 10, wherein the first power level is substantially in the range of 58 milliwatts to 132 milliwatts and the second power level is greater than 8.7 milliwatts.

12. The system of claim 1, wherein the data layer directly overlies the reference layer.

13. A method for magneto-optical recording comprising the steps of:

passing a recording medium proximate a magnetic source, the medium having a first and a second layer, the first layer having a coercive force greater than the coercive force of the second layer such that the magnetic source changes the magnetic orientation of the second layer in a first direction, but does not change the magnetic orientation of the first layer; and directing an electromagnetic beam at a selected first portion of the recording medium for a first period of time, said first period of time of short enough duration to create a temperature differential between the first and second layers such that the first layer is heated to a first temperature at least equal to the Curie temperature of the first layer, and the second layer is heated to a temperature less than the Curie temperature of the first layer, such that the selected first portion of the first layer has its magnetic orientation aligned with the magnetic orientation of the selected first portion of the second layer.

14. The method of claim 13, further including the step of:

directing an electromagnetic beam at a selected second portion of the medium for a second period of time, the second period of time being sufficient to heat the second layer to a temperature at least equal to the Curie temperature of the second layer, and simultaneously exposing said medium to a second magnetic source to change the magnetic orientation of said selected second portion of the first and second layers to a second direction.

15. The method of claim 13, wherein the Curie temperature of the first layer is less than the Curie temperature of the second layer.

16. The method of claim 13, wherein the Curie temperature of the first layer is substantially equal to the Curie temperature of the second layer.

17. The method of claim 13, wherein the first layer is comprised of $Tb_{20}Fe_{80}$ and the second layer is comprised of $Tb_{27}Fe_{63}Co_{10}$.

18. The method of claim 13, wherein the thickness of the second layer is greater than the thickness of the first layer.

19. The method of claim 13, wherein the first period of time is not greater than one nanosecond.

20. The method of claim 13, wherein the second period of time is not greater than 100 nanoseconds.

21. The method of claim 13, wherein the electromagnetic source comprises a laser.

22. The method of claim 21, wherein the laser is set at a first power level for the first period of time and a second power level for the second period of time, and the second power level is less than the first power level.

23. The method of claim 22, wherein the first power level is substantially in the range of 58 milliwatts to 132 milliwatts and the second power level is greater than 8.7 milliwatts.

24. The method of claim 13, wherein the first layer directly overlies the second layer.

* * * * *